US007328856B2

(12) United States Patent
Bloc et al.

(10) Patent No.: US 7,328,856 B2

(45) Date of Patent: Feb. 12, 2008

(54) AIRLESS DISPENSER FOR DISPENSING LOW DOSES OF LIQUID PRODUCTS, IN PARTICULAR COSMETIC OR PHARMACEUTICAL PRODUCTS

(75) Inventors: Richard Bloc, Derchigny-Graincourt (FR); Herve Lompech, Bouttencourt (FR)

(73) Assignee: Rexam Dispensing Systems S.A.S. (FR)

( * ) Notice: Subject to any disclaimer, the term of this patent is extended or adjusted under 35 U.S.C. 154(b) by 0 days.

(21) Appl. No.: 11/539,519

(22) Filed: Oct. 6, 2006

(65) Prior Publication Data

US 2007/0125884 A1 Jun. 7, 2007

Related U.S. Application Data

(63) Continuation of application No. PCT/FR2005/000639, filed on Mar. 16, 2005.

(30) Foreign Application Priority Data

Apr. 8, 2004 (FR) .................................. 04 03732

(51) Int. Cl.
*B01D 17/00* (2006.01)

(52) U.S. Cl. ...................... 239/328; 239/323; 239/476; 239/486; 239/491; 239/493; 239/570; 239/500; 222/95; 222/107; 222/160; 222/206; 222/386

(58) Field of Classification Search ................ 239/320, 239/323, 328, 331, 463, 476, 482, 486, 491, 239/492, 493, 569, 570, 571, 600; 222/92, 222/107, 95, 105, 160, 386, 206, 212

See application file for complete search history.

(56) References Cited

U.S. PATENT DOCUMENTS

| | | | | |
|---|---|---|---|---|
| 1,544,232 | A * | 6/1925 | Huntoon, Jr. | 239/328 |
| 3,752,366 | A | 8/1973 | Lawrence, Jr. | 222/207 |
| 4,067,499 | A * | 1/1978 | Cohen | 239/323 |
| 4,773,570 | A * | 9/1988 | Workum | 239/493 |
| 4,921,142 | A * | 5/1990 | Graf et al. | 222/386 |
| 6,715,697 | B2 * | 4/2004 | Duqueroie | 222/107 |
| 6,742,724 | B2 * | 6/2004 | Duqueroie | 239/328 |

FOREIGN PATENT DOCUMENTS

FR 2 853 635 10/2004

OTHER PUBLICATIONS

International Search Report, Jul. 26, 2005, 2 pages.

* cited by examiner

*Primary Examiner*—Steven J. Ganey
(74) *Attorney, Agent, or Firm*—St. Onge Steward Johnston & Reens LLC

(57) ABSTRACT

The invention relates to an airless dispenser which is used to dispense low doses of liquid products. The inventive dispenser is characterised in that it consists of: a first part comprising a spray nozzle which is communicated with a network of channels on the wall of an inner truncated-cone-shaped bore, and a second part comprising a deformable container which equipped with a rigid flange for fixing the first part in the aforementioned bore. The outer periphery of the flange comprises an inclined surface which defines a vortex chamber, opposite the above-mentioned network of channels, and which, together with the wall of the first part, forms an internal peripheral outlet groove. The outlet groove is defined radially by a flexible lip forming an inlet valve which is supported by the first or second part.

11 Claims, 3 Drawing Sheets

AIRLESS DISPENSER FOR DISPENSING LOW DOSES OF LIQUID PRODUCTS, IN PARTICULAR COSMETIC OR PHARMACEUTICAL PRODUCTS

CROSS-REFERENCE TO RELATED APPLICATIONS

The present application is a continuation of pending International patent application PCT/FR2005/000639 filed on Mar. 16, 2005 which designates the United States and claims priority from French patent application 0403732 filed on Apr. 8, 2004, the content of which is incorporated herein by reference.

FIELD OF THE INVENTION

The invention relates to a dispenser with no air intake for the distribution of small doses of liquid products and, in particular, of cosmetic or pharmaceutical products.

BACKGROUND OF THE INVENTION

In the field of perfumes, these dispensers generally consist of miniature sprays comprising a small-capacity reservoir (several millilitres) equipped with a lifting mechanism, such as a pre-compression pump or a valve, which has the task of dispensing a sample of product in vapour form by manually pressing an actuator.

However, bearing in mind their small dimensions, the parts that make up these dispensers are complex and difficult to make as well as to assemble, which makes their resale price high.

In particular, the indexing of parts among each other in order to obtain the correct relative positioning during assembly is the cause of many operating faults.

Furthermore, the proportions of the lifting mechanism are considerable in relation to the volume of the reservoir, in particular when a pump is used, which is penalising on the consumer, who receives a reduced dose of the product for testing.

Finally, the operations of storing and transporting the dispensers are quite delicate since the actuator of the pump or valve sticks out and is not firmly attached to the lifting mechanism.

The invention has the aim of solving these technical problems in a satisfactory manner.

SUMMARY OF THE INVENTION

This aim is achieved, according to the invention, by means of a dispenser characterised in that it includes a first part comprising a spray nozzle that communicates with a network of channels made locally in the wall of a tapered internal bore and a second part comprising a deformable reservoir equipped with a rigid flange for attachment in the bore of the first part, said flange having, on its outer perimeter, a tilted face that delimits a whirl chamber opposite said network of channels and forms a peripheral outlet groove inside the wall of said first part, which is radially delimited by a flexible lip forming an intake valve, which is made on said first or second part.

According to one advantageous characteristic, said flange comprises hooking elements that cooperate with complementary elements made in the wall of said bore in order to ensure the watertight assembly of the two parts.

According to a first variant, the flange of the second part has symmetrical rotation.

According to another characteristic, the dispenser includes an external skirt that extends said first part downwards or is connected to the flange of said second part to enable the covering of said reservoir.

According to a variant, the skirt is elastically deformable so as to enable the indirect manipulation of said reservoir.

According to another variant, said skirt has a peripheral recess for the hooking of an external packaging element.

Said first part preferably comprises a concave top face that facilitates manual holding.

According to a further variant, said reservoir consist of a flexible bag in the form of a gusset.

According to another characteristic, the bottom of the reservoir is equipped with an operating button that enables axial compression.

The reservoir is preferably equipped with an internal boss that is capable of coming to a stop against the wall of said first part when all the contents have been dispensed.

According to another variant, the dispenser comprises a removable plug with a tab, which is intended for blocking said nozzle.

The dispenser of the invention is very compact and only consists of two parts with simple structures that can be easily manufactured, for example, by moulding of plastic materials.

In addition, the assembly of these parts is straightforward and can be easily automated, since no indexing of parts among each other is required.

The absence of a mechanism for lifting the product guarantees the reliability of the dispenser and makes its price very attractive for customers, in particular in the sector of samples.

Finally, the way in which this dispenser is operated is particularly ergonomic and offers precise, dosed spraying.

BRIEF DESCRIPTION OF THE DRAWINGS

The invention will be understood better from reading the following description, made in reference to the drawings, in which.

DETAILED DESCRIPTION OF THE INVENTION

The dispenser shown in the figures is designed for spraying small doses of liquid products such as samples of perfumes or cosmetic products.

Figure 1A:
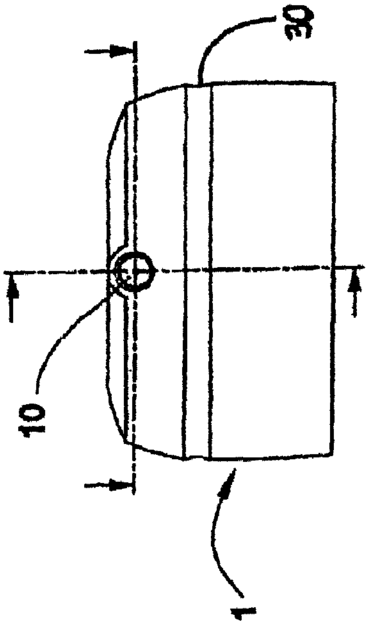
FIG. 1A shows a front view of one embodiment of the dispenser according to the invention, FIGS. 1B and 1C respectively show axial and transversal (horizontal) section views of the dispenser of FIG. 1A.
Figure 1B:
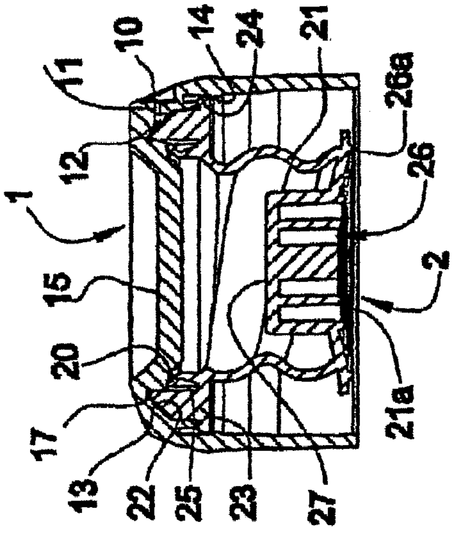

According to the invention, the dispenser includes a first part 1 comprising a lateral nozzle 10 that communicates, via a pipe 11, with a network of channels 12 made locally in the wall of a tapered internal bore 13, as shown in a cross-section in FIG. 1B.

The dispenser also comprises a second part 2 comprising a deformable reservoir 21, here in the form of a flexible bag with gussets, surmounted by a rigid flange 23 for attachment in the bore 13 of the first part 1.

For this purpose, the flange 23 is equipped with hooking elements 24 that cooperate with complementary elements, in this case in the shape of a rush 14, made in wall of the bore 13 in order to ensure the watertight snap-fitting of part 1 in part 2.

Other means for attaching the two parts to each other can be provided, however, such as screwing or gluing in particular.

In the embodiments of the invention shown, the flange 23 extends over the open edge of the reservoir 21 with symmetrical rotation.

The flange 23 has, on its outer perimeter, a tilted face 22 that delimits, opposite the network of channels 12, a whirl chamber of the type described in patent application FR 03 04418.

The face 22 ensures, by cladding, the watertight sealing of the channels of the network 12 after the assembly of the two parts 1, 2.

Due to the symmetry of the flange 23, no angular indexing of the two parts in relation to each other is necessary, which considerably simplifies the assembly operations, which are performed simply by aligning the parts 1, 2 in the axial direction and snap-fitting them together.

Figure 3D:
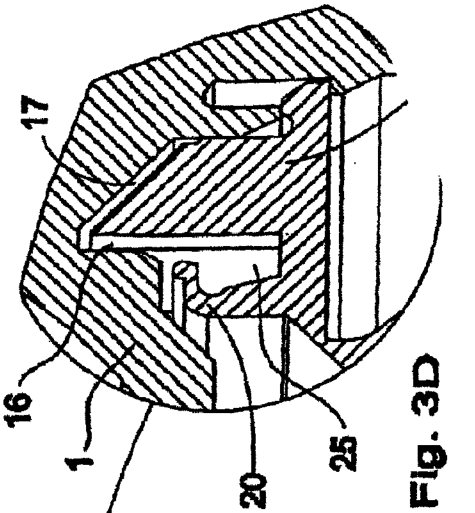
FIG. 3D is a detail view of FIG. 3B according to the cross-section plane defined in FIG. 1 C.

The flange 23 includes one wall adjacent to the face 22, which forms, together with the inner wall of the first part 1, a peripheral groove 25 for the passage of the product under pressure from the reservoir 21 in the direction of the whirl chamber. The groove 25 is in communication, by means of sectoral vertical slots 16, with an annular space 17, arranged on either side of the whirl chamber between the face 22 of the flange 23 and the inner wall of the bore 13 (see FIGS. 1C and 3D).

The groove 25 is radially delimited by a flexible annular lip 20 forming an intake valve for the outlet circuit which consists, from the upstream end to the downstream end, of the groove 25, the slots 16, the annular space 17 and the whirl chamber.

The lip 20 in this case is made on the flange 23 of the second part 2, but it is possible, according to a variant of the invention (not shown) to make it on the first part 1.

Figure 1C:
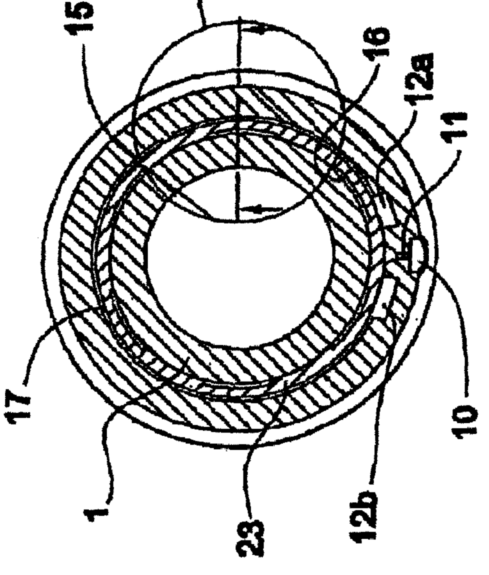

In the embodiment of the invention shown in FIGS. 1A, 1B and 1C, the first part 1 comprises a concave top face 15 for manual holding with the index finger, while the bottom 21*a* of the reservoir 21 is equipped with an operating button 26 that enables direct axial compression of the reservoir using the thumb. The tactile support is facilitated by the presence of press points or concentric grooving 26*a*.

The reservoir is equipped, in addition, with an internal boss 27 which extends the button 26 inwards and is capable of coming to a stop against the wall 15*a* of the first part 1 in order to optimise the dispensing and the release rate of the product.

The first part 1 is extended downwards by an outer skirt 3 that enable the covering of the reservoir 21.

The skirt 3 has a peripheral recess 30 for the hooking of an external packaging element (not shown).

Figure 3A:
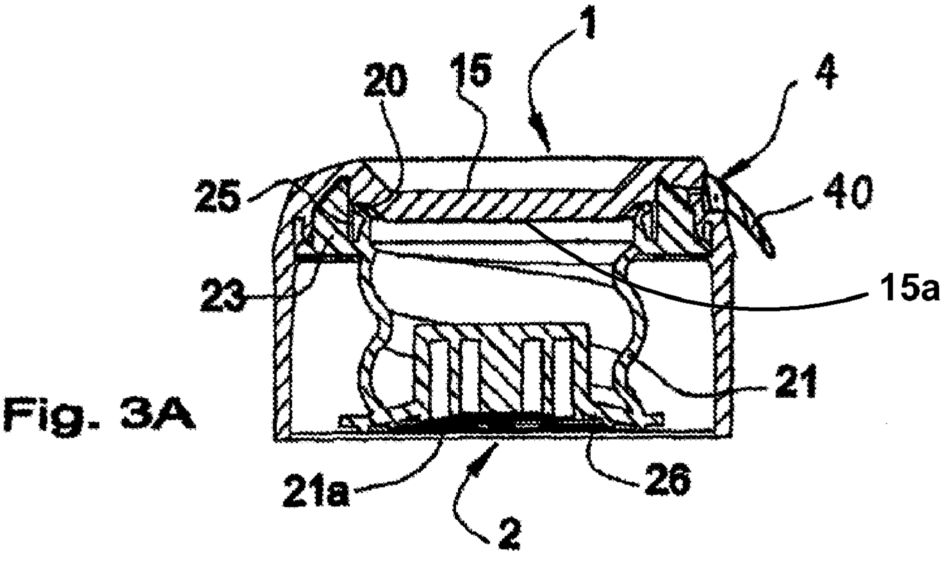
FIGS. 3A to 3C shows the dispenser in FIGS. 1A and 1B in different positions.

In the storage position, the dispenser can be equipped with a removable plug 4 with a tab 40 intended for blocking the spraying nozzle (see FIG. 3A).

Figure 2B:
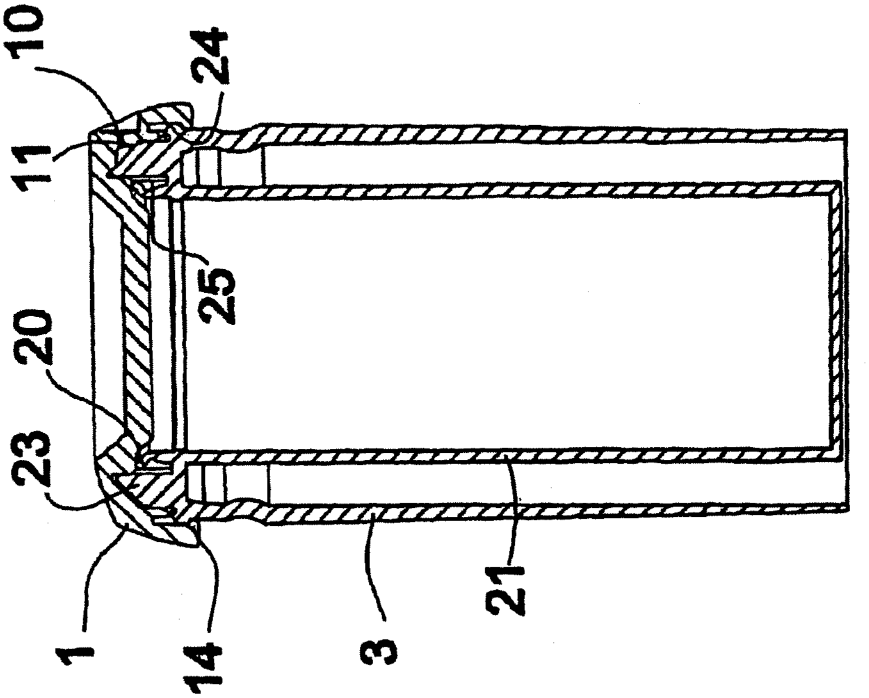
FIG. 2B is a section view of the dispenser of FIG. 2A.
Figure 2A:
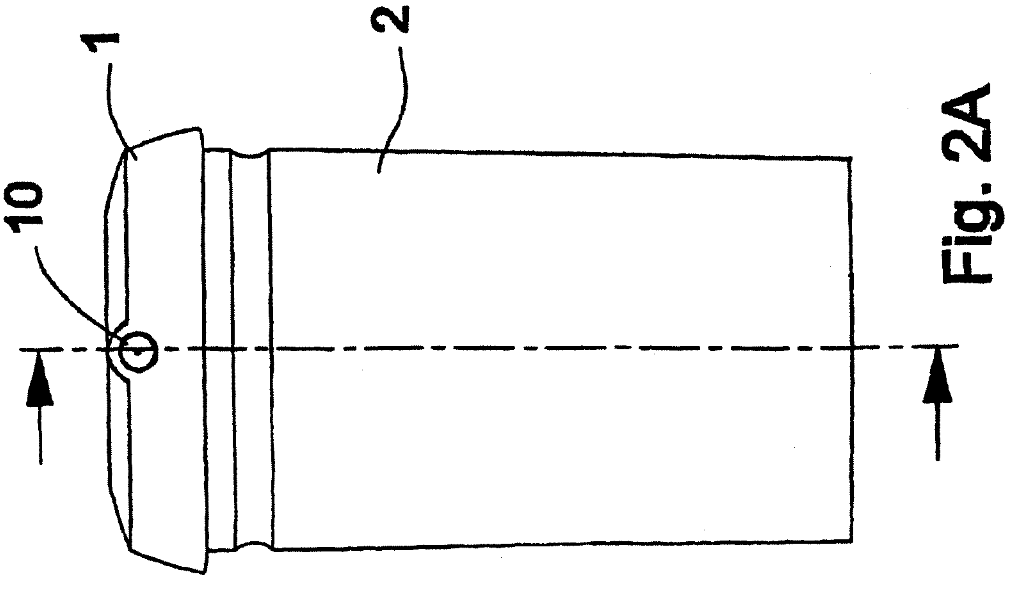
FIG. 2A shows a perspective view of a second embodiment of the dispenser according to the invention.

In the embodiment of the invention shown in FIGS. 2A and 2B, the outer skirt 3 is elastically deformable and, in this case, connected at the top to the flange 23.

In this way, the second part 2 is provided with a double wall.

In this case, the handling of the reservoir 21 with a view to compressing it can be performed indirectly by lateral crushing and/or pinching of the skirt 3, which then returns to its initial shape hiding the deformed wall of the reservoir 21.

This variant also makes it possible to extend the length of the dispenser since the deformation of the reservoir in this case is lateral and not axial and to provide the consumer with an appearance and a way of holding the dispenser that are traditional for this type of product.

Obviously, this way of deforming the reservoir can also be applied to the embodiment of the invention shown in FIG. 1A by connecting the skirt 3 to the part 1.

The operation of the dispenser according to the invention is described below following the various steps in the dispensing of the product.

In the resting position, which corresponds to the blocking of the outlet circuit (FIG. 3A), the top end of the lip 20 rests in a watertight fashion against the inner wall of the part 1.

Figure 3B:
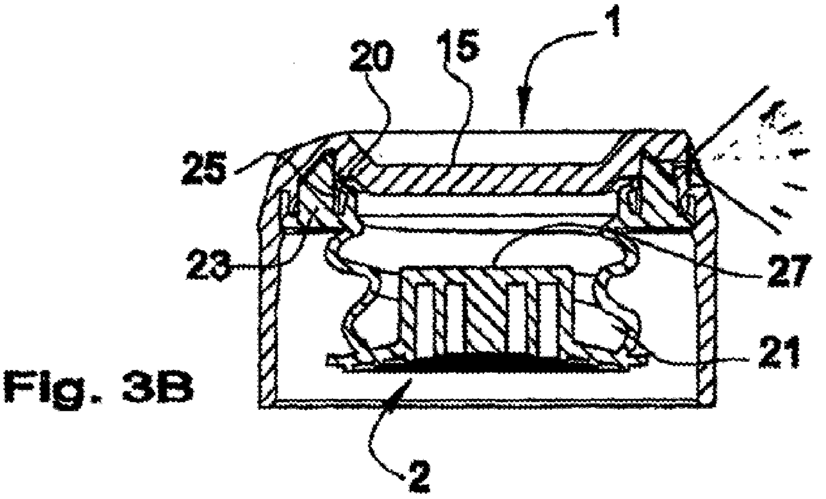

When pressure is generated in the reservoir 21 as shown in FIG. 3B (applied to the embodiment of the invention shown in FIG. 1A), by manually pressing the bottom 21*a* of the reservoir 21, the product is pushed into the top of the reservoir 10 and deforms the lip 20. It is then released by seeping between the edge of the lip 20 and the inner wall of the bore 13 and enters the groove 25; then, via the slots 16, it passes over the top edge of the flange 23 and enters the dividing annular space 17 (detail in FIG. 3D)

The product flow is divided between the two symmetrical sections of the groove 25 and is then released in the direction of the whirl chamber, which is supplied from the space 17 by its two lateral intakes 12*a*, 12*b*. The product is then accelerated by the channels 12 before being expelled to the outside in the form of a spray via the nozzle 10.

The dose ends when the boss 27 comes to a stop against the part 1 by means of the top opening of the reservoir 21.

Obviously, the dimensions and, in particular, the volume of the reservoir 21 as well as its capacity to deform will be determined so that the end of the travel of the boss 27 corresponds to the distribution of a single, precise dose or, when applicable, several doses of the product.

Figure 3C:
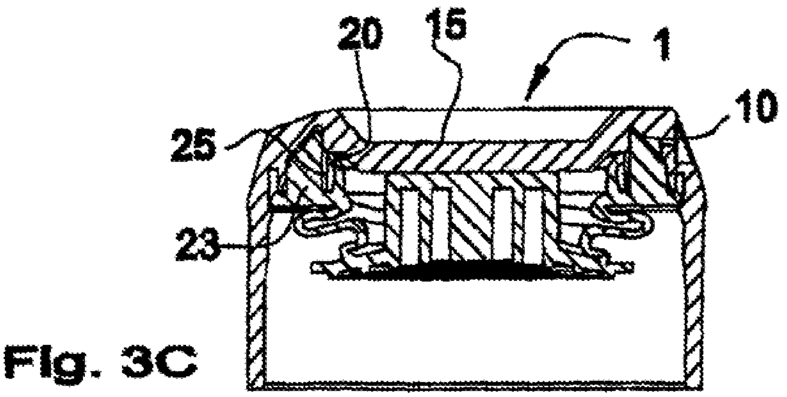

The return of the lip 20 to its watertight blocking position is carried out in an elastic manner when the pressure inside the reservoir 21 stops, as shown in FIG. 3C, thus preventing air from entering the reservoir 21.

What is claimed is:

1. Dispenser with no air intake for small doses of liquid products, characterised in that it includes a first part comprising a spraying nozzle that communicates with a network of channels arranged locally in a wall of a tapered internal bore and a second part comprising a deformable reservoir equipped with a rigid flange for attachment in the tapered internal bore of said first part, said rigid flange having, on its outer perimeter, a tilted face that delimits, opposite said network of channels, a whirl chamber and forming, internally with the wall of the tapered internal bore, a peripheral outlet groove radially delimited by a flexible lip forming an intake valve, which is made on said first or second part.

2. Dispenser according to claim 1, characterised in that said rigid flange comprises hooking elements that cooperate with complementary elements made in the wall of said tapered internal bore to ensure the watertight assembly of the two parts.

3. Dispenser according to claim 1, characterised in that the rigid flange of the second part has symmetrical rotation.

4. Dispenser according to claim 1, characterised in that it comprises an outer skirt that extends said first part downwards or is connected to the rigid flange of said second part to enable the covering of said deformable reservoir.

5. Dispenser according to claim 4, characterised in that said skirt is elastically deformable to enable the indirect manipulation of said deformable reservoir.

6. Dispenser according to claim 4, characterised in that said skirt has a peripheral recess for the hooking of an external packaging element.

7. Dispenser according to claim 1, characterised in that said first part comprises a concave top face that facilitates manual holding.

8. Dispenser according to claim 1, characterised in that said deformable reservoir consists of a flexible bag with gussets.

9. Dispenser according to claim 1, characterised in that the bottom of the deformable reservoir is equipped with an operating button enabling axial compression.

10. Dispenser according to claim 1, characterised in that the deformable reservoir is equipped with an internal boss that is capable of coming to a stop against a wall of said first part at the end of the dose.

11. Dispenser according to claim 1, characterised in that it comprises a removable plug with a tab intended for blocking said nozzle.

* * * * *